US008817498B2

(12) United States Patent
Choi (10) Patent No.: US 8,817,498 B2
(45) Date of Patent: Aug. 26, 2014

(54) HYBRID CONTROL TECHNIQUES FOR SERIES RESONANT CONVERTER

(75) Inventor: Hangseok Choi, Bedford, NH (US)

(73) Assignee: Fairchild Semiconductor Corporation, San Jose, CA (US)

( * ) Notice: Subject to any disclaimer, the term of this patent is extended or adjusted under 35 U.S.C. 154(b) by 102 days.

(21) Appl. No.: 13/447,762

(22) Filed: Apr. 16, 2012

(65) Prior Publication Data

US 2013/0010503 A1 Jan. 10, 2013

Related U.S. Application Data (60) Provisional application No. 61/489,856, filed on May 25, 2011.

(51) Int. Cl.
*H02M 7/538* (2007.01)
*H02M 7/515* (2007.01)

(52) U.S. Cl.
USPC ......... 363/25; 363/17; 363/21.02; 363/21.03; 363/24; 363/26; 363/95; 363/98; 363/131; 363/132; 363/133; 363/134

(58) Field of Classification Search
USPC ............. 363/17, 21.02, 21.03, 24, 25, 26, 95, 363/98, 131, 132, 133, 134
See application file for complete search history.

(56) References Cited

U.S. PATENT DOCUMENTS

| 4,805,081 | A  | * | 2/1989  | Chambers et al. | ............... 363/96 |
| 7,986,535 | B2 | * | 7/2011  | Jacobson et al. | ................ 363/17 |
| 8,107,263 | B2 | * | 1/2012  | Ueno et al. | ................ 363/21.02 |
| 2005/0180175 | A1 | * | 8/2005  | Torrey et al. | .................... 363/17 |
| 2009/0231887 | A1 | * | 9/2009  | Ye et al. | ..................... 363/21.02 |
| 2009/0290389 | A1 | * | 11/2009 | Ueno et al. | ................ 363/21.02 |

OTHER PUBLICATIONS

NCP1395A/B—datasheet, High Performance Resonant Mode Controller, ON Semiconductor, Mar. 2006, 27 pages, Rev 1.
L6599 datasheet, High-voltage resonant controller, STMicroelectronics, May 2006, 36 pages, Rev 1.
FAN7621 datasheet, PFM Controller for Half-Bridge Resonant Cconverters, Fairchild Semiconductor, Jul. 2009, 17 pages, Rev 1.0.1.
CM6901 datasheet, SLS (SRC/LLC+SR) Controller with 1 FM+2 PWMs, Champion Microelectronic Corporation, Nov. 2, 2009, 15 pages, Rev 1.4.

* cited by examiner

*Primary Examiner* — Bao Q Vu
(74) *Attorney, Agent, or Firm* — Grossman Tucker Perreault & Pfleger PLLC (57) ABSTRACT

A DC to DC converter system, includes inverter circuitry having a first and a second switch, the inverter circuitry further configured to generate a first and a second gate control signal, the signals configured to open and close the first and second switch, respectively, and generate an AC signal from a DC input signal. The system further includes transformer circuitry configured to transform the AC signal into a sinusoidal AC signal, second stage circuitry configured to rectify the sinusoidal AC signal to a DC output signal, and hybrid control circuitry configured to modulate the first and second gate control signals, wherein the modulation comprises pulse frequency modulation (PFM) and pulse width modulation (PWM).

16 Claims, 7 Drawing Sheets

HYBRID CONTROL TECHNIQUES FOR SERIES RESONANT CONVERTER

CROSS REFERENCE TO RELATED APPLICATIONS

This application claims the benefit of U.S. provisional patent application Ser. No. 61/489,856 filed May 25, 2011, which is incorporated fully herein by reference.

FIELD

The present disclosure relates to a DC/DC converter system, and more particularly, to hybrid control techniques for a series resonant DC/DC converter system.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure provides hybrid controlling techniques for a series resonant DC to DC converter for optimal operation under both normal and light load conditions. A problem that occurs in traditional series resonant converter designs is that the switching frequency, which varies as a function of output load, increases to undesirable levels in order to regulate the output voltage under light load or no load condition. The reason that higher switching frequencies are undesirable is that even though the primary side switches are turned on under zero voltage conditions (called zero voltage switching or ZVS), they are not turned off under zero voltage conditions which results in hard switching. Thus, the extremely high switching frequency at light load conditions typically results in high switching losses. One existing method to limit the switching frequency increase under light load condition is called burst mode operation, where the switching operation periodically pauses and then resumes. Burst mode operation, however, usually causes too much ripple on the output voltage since the output voltage drops while the switching operation is paused. Another problem with burst mode operation is audible noise that is generated by the on off cycling of the bursts.

Another possible method to prevent extremely high switching frequency is to employ conventional pulse width modulation (PWM) operation under light load conditions. Under conventional PWM, the dead time, from the turn off of switch Q1 to the turn on of switch Q2 (Q1-to-Q2 dead time) is the same as the Q2-to-Q1 dead time, and dead times increase as load decreases to achieve PWM operation. This method does not result in increased output voltage ripple or audible noise. However, zero voltage switching of Q1 and Q2 are lost due to the increasingly long dead time.

In certain embodiments of the present disclosure, new hybrid control techniques are employed that combine PFM with a limiting upper frequency threshold along with new PWM techniques that allow for zero voltage switching. These techniques control the converter under varying load conditions while maintaining zero voltage switching of at least one of the two switches in the primary side. A feedback compensation signal (Vcomp), based on feedback from the output voltage of the converter, is provided to the PFM circuit to determine the switching frequency under normal load conditions. The switching frequency is limited at the high end, however, by a clamp voltage (Vclmp) to avoid excess increase of the switching frequency. The Vcomp signal is also provided to the PWM circuit to determine the duty cycle under light load condition, as will be explained in greater detail below. The PWM is also configured to generate a switching pattern designed to minimize switching losses by ensuring that zero voltage switching (ZVS) is achieved for one of the two switches (Q1 and Q2).

Figure 1:
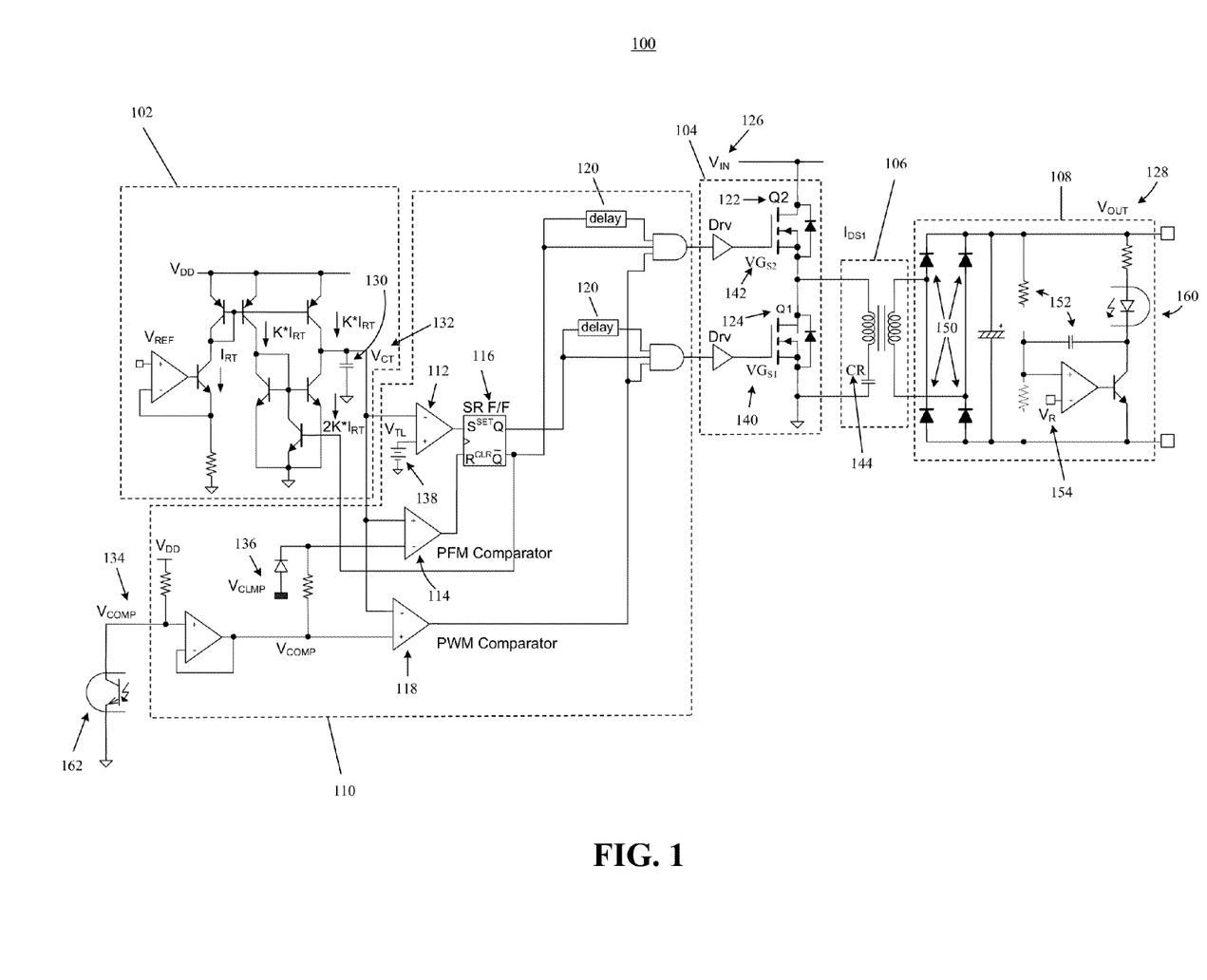
FIG. 1 illustrates a DC to DC series resonant converter system consistent with various embodiments of the present disclosure.

FIG. 1 illustrates a DC/DC series resonant converter system 100 consistent with various embodiments of the present disclosure. As will be explained below, PFM control circuitry imposes an upper limit on the switching frequency while PWM control circuitry allows ZVS of switch Q1 124 by ensuring that switch Q1 is turned on right after switch Q2 122 is turned off.

The DC/DC converter 100 includes voltage controlled oscillator (VCO) circuitry 102, inverter circuitry 104, transformer circuitry 106, secondary stage circuitry 108, and hybrid modulation control circuitry 110. The DC/DC converter system 100 is configured to receive an input DC voltage (Vin) 126 and generate an output DC voltage (Vout) 128. Generally, the gain of the DC/DC converter system 100 may be controlled by the switching frequency (fs) of the switches Q1 124 and Q2 122 in relation to the resonant frequency (f0) of the transformer circuitry 106.

The voltage controlled oscillator circuitry 102 is configured to sequentially charge and discharge a pulse frequency modulated capacitor (PFMcap) 130 such that the voltage (VCT) 132 of PFMcap 130 oscillates between a high voltage threshold (VCOMP 134 if VCOMP>VCLMP or VCLMP 136 if VCOMP<VCLMP) and a low voltage threshold (VTL) 138, for example, as represented by a triangular waveform. A first comparator 112 compares VCT against the low threshold VTL. A second comparator 114 compares VCT against the high threshold (VCOMP if VCOMP>VCLMP or VCLMP if VCOMP<VCLMP). The output of these comparators 112, 114 set and reset the Q and Qn outputs of the SR flip-flop 116, thereby creating a square waveform signal. The square waveform signal is limited to a frequency range that is determined by the selection of operational parameters VCLMP and VTL which will be described more fully in the description of FIG. 2 below.

The inverter circuitry 104 comprises a first and a second switch Q1 124 and Q2 122 configured to turn on and off in response to gate control signals (VGS1 and VGS2, respectively) based at least in part, on the waveform signal from the voltage controlled oscillator circuitry 102. The delay mechanisms 120 may be provided to prevent each switch from simultaneously conducting. The gate control signals VGS1 140, VGS2 142 are configured to open and close switches Q1 and Q2, respectively, creating a modulated pulse waveform, thereby controlling the charging and discharging of the resonance capacitor CR 144 on the primary side of the transformer circuitry 106. This results in an output on the secondary side of transformer circuitry 106 which approximates a sinusoidal waveform.

The secondary stage circuitry 108 comprises a rectifier diode network 150 to rectify the sinusoidal waveform and a low pass filter circuit 152, which may be an RC network, to smooth the DC output voltage Vout 128.

The hybrid modulation control circuitry 110 uses a mixture of Pulse Frequency Modulation (PFM) and Pulse Width Modulation (PWM) to optimize control of the power level depending on load conditions and maintain a desired overall gain for the DC to DC converter. Under normal operating conditions a conventional PFM modulation with a 50% duty cycle with a small dead time between VGS1 140 and VGS2 142 is used to achieve zero voltage switching of Q1 124 and Q2 122. The switching frequency generally needs to increase as the load decreases in order to maintain a desired converter gain. Higher frequencies, however, result in switching losses, so under light load conditions the switching frequency is fixed at a preset threshold and PWM modulation is employed to maintain the converter gain while limiting the switching frequency increase.

In normal PFM operation, a Compensation voltage, Vcomp 134, which is derived and fed back from the difference between the desired output voltage Vr 154 and the actual output voltage Vout 128, is provided to the inverted input of the PFM comparator 114, which determines the switching frequency. The feedback is accomplished through feedback mechanisms 160 and 162, which may be an opto-electric coupling or other suitable mechanism. When the Comp voltage, Vcomp 134, is lower than the Clamp voltage, Vclmp 136, the inverted input of PFM comparator 114 is clamped at Vclmp which fixes the switching frequency. Additionally, the Comp voltage, Vcomp, is compared with the voltage (VCT) 132 of PFMcap 130 at PWM comparator 118 to control the duty cycle and maintain zero voltage switching of Q1 124.

Figure 2:
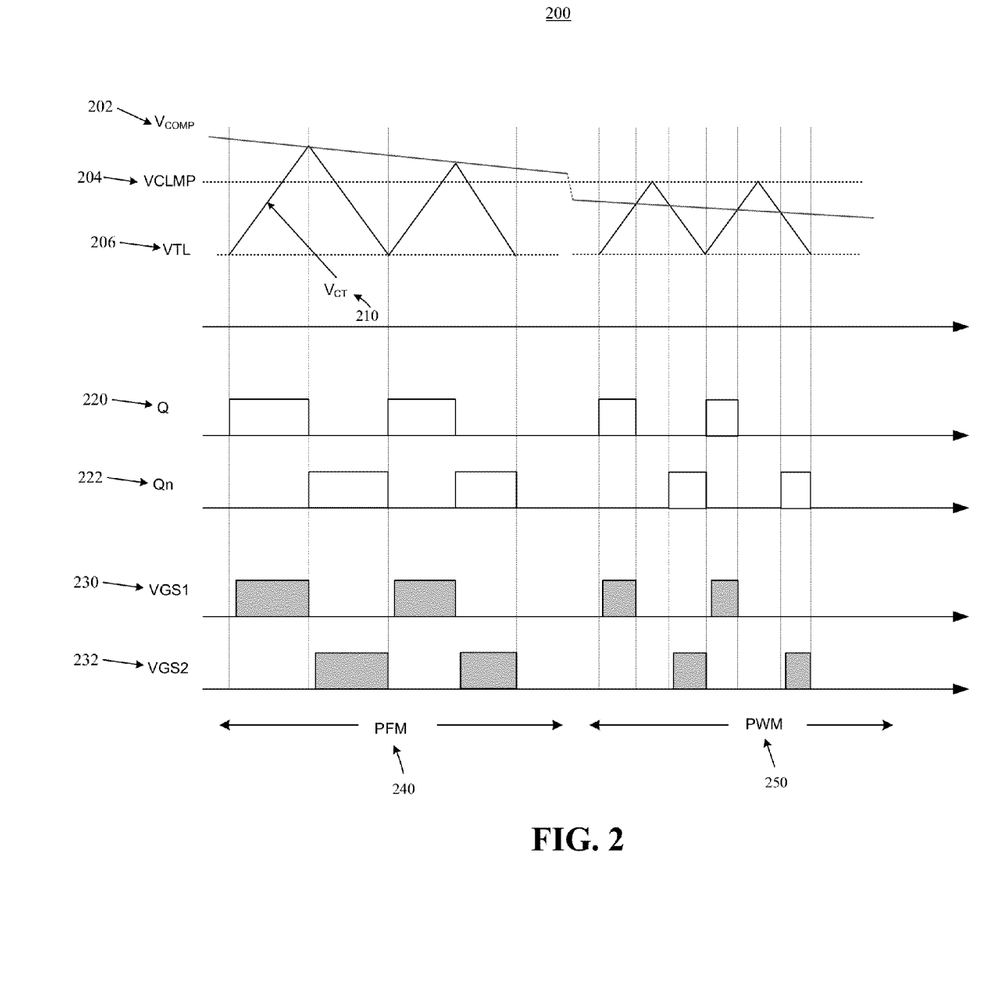
FIG. 2 illustrates a timing diagram of various signals consistent with one embodiment of the present disclosure.

FIG. 2 illustrates a timing diagram 200 of various signals consistent with one embodiment of the present disclosure. VCT 210 is seen to be a triangular waveform that oscillates between VTL 206 at the low end and either Vcomp 202 or Vclmp 204 at the high end depending on whether the circuit is in PFM mode 240 or PWM mode 250, respectively. When Vcomp 202 exceeds Vclmp 204, the circuit is in PFM mode 240, and the frequency of VCT increases as Vcomp decreases in response to decreasing output load. When Vcomp falls below Vclmp, the circuit transitions to PWM mode and VCT is clamped on the high end at Vclmp by the PFM comparator 114 which maintains VCT at a constant upper limited frequency.

Also shown in FIG. 2 are the output Q 220 and inverted output Qn 222 of SR flip-flop 116 which provides a square waveform that matches the frequency of VCT. Further, when the circuit is in PWM mode, the square wave form duty cycle can be seen to decrease as Vcomp decreases to provide an appropriate response to the decreasing output load condition.

Signals VGS1 230 and VGS2 232 illustrate the gate voltages at switches Q1 and Q2. The figure illustrates how the gate voltages are driven in response to the changing VCT 210. Specifically, VGS2 turns on, shortly after VCT reaches Vcomp and turns off when VCT reaches VTL. VGS1 is turned on right after VGS2 is turned off. Since Q1 is turned on right after Q2 is turned off with a small dead time, zero voltage switching for Q1 can be achieved.

Figure 3:
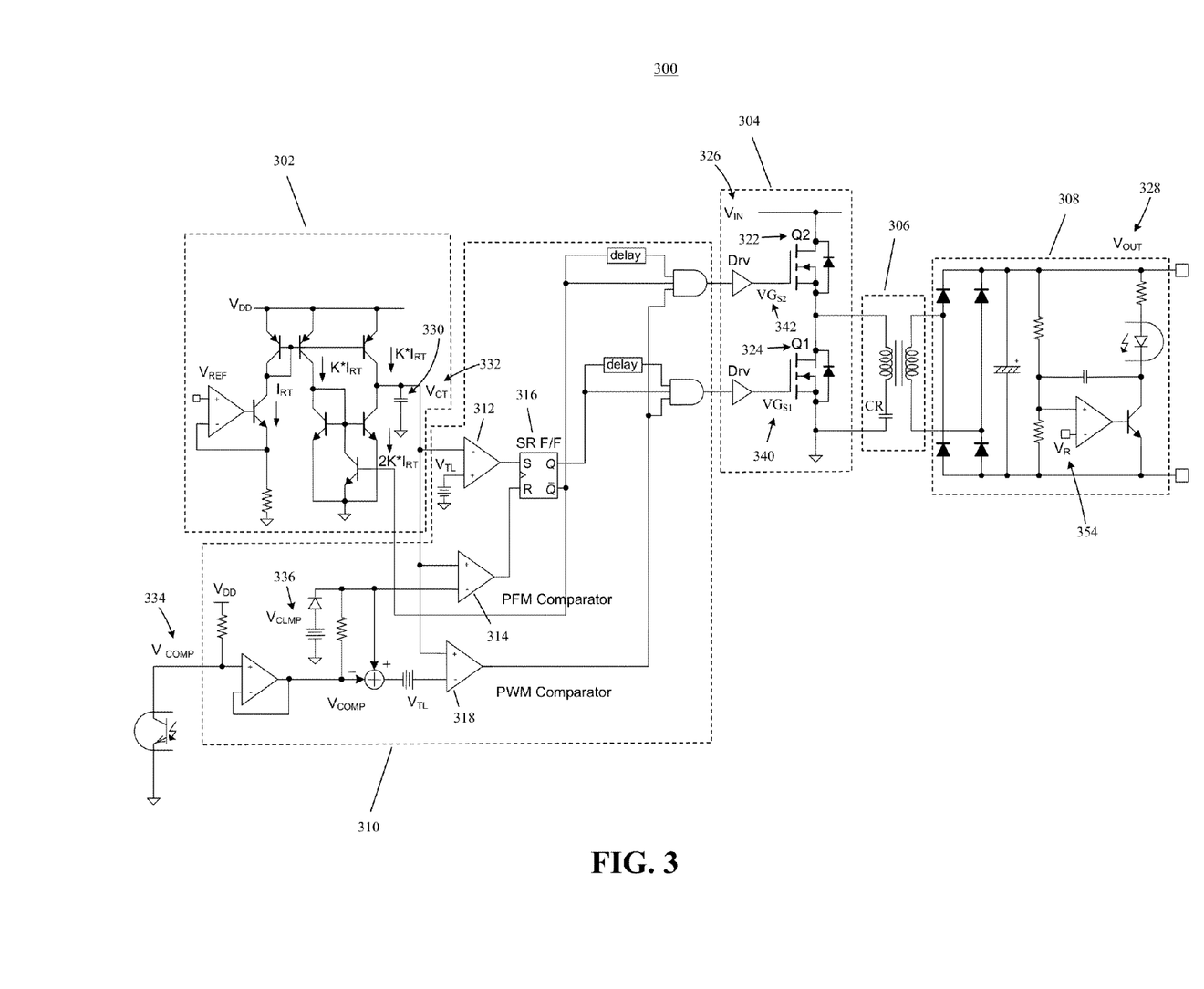
FIG. 3 illustrates an alternative embodiment of a DC/DC series resonant converter system consistent with various embodiments of the present disclosure.

FIG. 3 illustrates an alternative embodiment of a DC/DC series resonant converter system 300 consistent with various embodiments of the present disclosure. The PWM control in this alternative embodiment allows ZVS of switch Q2 322 by ensuring that switch Q2 is turned on right after switch Q1 324 is turned off.

The DC/DC converter 300 includes voltage controlled oscillator (VCO) circuitry 302, inverter circuitry 304, transformer circuitry 306, secondary stage circuitry 308, and hybrid modulation control circuitry 310. The DC/DC converter system 300 is configured to receive an input DC voltage (Vin) 326 and generate an output DC voltage (Vout) 328 and is similar in most respects to the circuit of FIG. 1, with the exception of the hybrid control circuitry 310.

The hybrid control circuitry 310 uses a mixture of Pulse Frequency Modulation (PFM) and Pulse Width Modulation (PWM) to optimize control of the power level depending on load conditions and maintain a desired overall gain for the DC to DC converter. Under normal operating conditions a conventional PFM modulation with a 50% duty cycle with a small dead time between VGS1 340 and VGS2 342 is used to achieve zero voltage switching of Q1 324 and Q2 322. The switching frequency generally needs to increase as the load decreases in order to maintain a desired converter gain. Higher frequencies, however, result in switching losses, so under light load conditions, the switching frequency is fixed at a preset threshold and PWM modulation is employed to maintain the converter gain while limiting the switching frequency increase.

In normal PFM operation, a Compensation voltage, Vcomp 334, which is derived and fed back from the difference between the desired output voltage Vr 354 and the actual output voltage Vout 328, is provided to the inverted input of the PFM comparator 314, which determines the switching frequency. When the Comp voltage, Vcomp 334, is lower than the Clamp voltage, Vclmp 336, the inverted input of PFM comparator 314 is clamped at Vclmp which fixes the switching frequency. Additionally, the voltage (VCT 332) of PFMcap 330 is compared to a signal calculated from Vclmp−Vcomp+VTL at PWM comparator 318 to control the duty cycle and maintain zero voltage switching of Q2 322.

Figure 4:
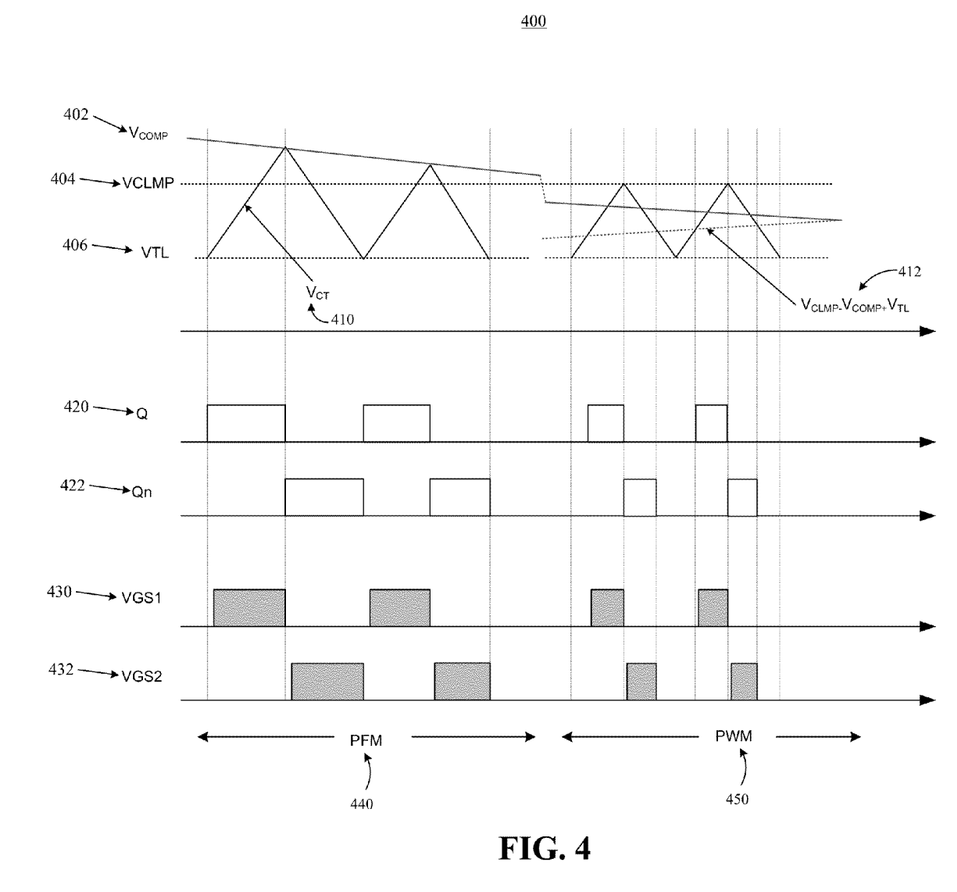
FIG. 4 illustrates a timing diagram of various signals consistent with an alternative embodiment of the present disclosure.

FIG. 4 illustrates a timing diagram 400 of various signals consistent with an alternative embodiment of the present disclosure. VCT 410 is seen to be a triangular waveform that oscillates between VTL 406 at the low end and either Vcomp 402 or Vclmp 404 at the high end depending on whether the circuit is in PFM mode 440 or PWM mode 450, respectively. When Vcomp 402 exceeds Vclmp 404, the circuit is in PFM mode 440, and the frequency of VCT increases as Vcomp decreases in response to decreasing output load. When Vcomp falls below Vclmp, the circuit transitions to PWM mode and VCT is clamped on the high end at Vclmp by the PFM comparator 114 which maintains VCT at a constant upper limited frequency.

Also shown in FIG. 4 are the output Q 420 and inverted output Qn 422 of SR flip-flop 116 which provides a square waveform that matches the frequency of VCT. Further, when the circuit is in PWM mode, the square wave form duty cycle can be seen to decrease as Vcomp decreases to provide an appropriate response to the decreasing output load condition.

Signals VGS1 430 and VGS2 432 illustrate the gate voltages at switches Q1 and Q2. The figure illustrates how the gate voltages are driven in response to the changing VCT 410. Specifically, VGS1 turns on, shortly after VCT reaches Vclmp−Vcomp+VTL 412 and turns off when VCT reaches Vclmp. VGS2 is turned on right after VGS1 is turned off. Since Q2 is turned on right after Q1 is turned off with a small dead time, zero voltage switching for Q2 can be achieved.

Figure 5:
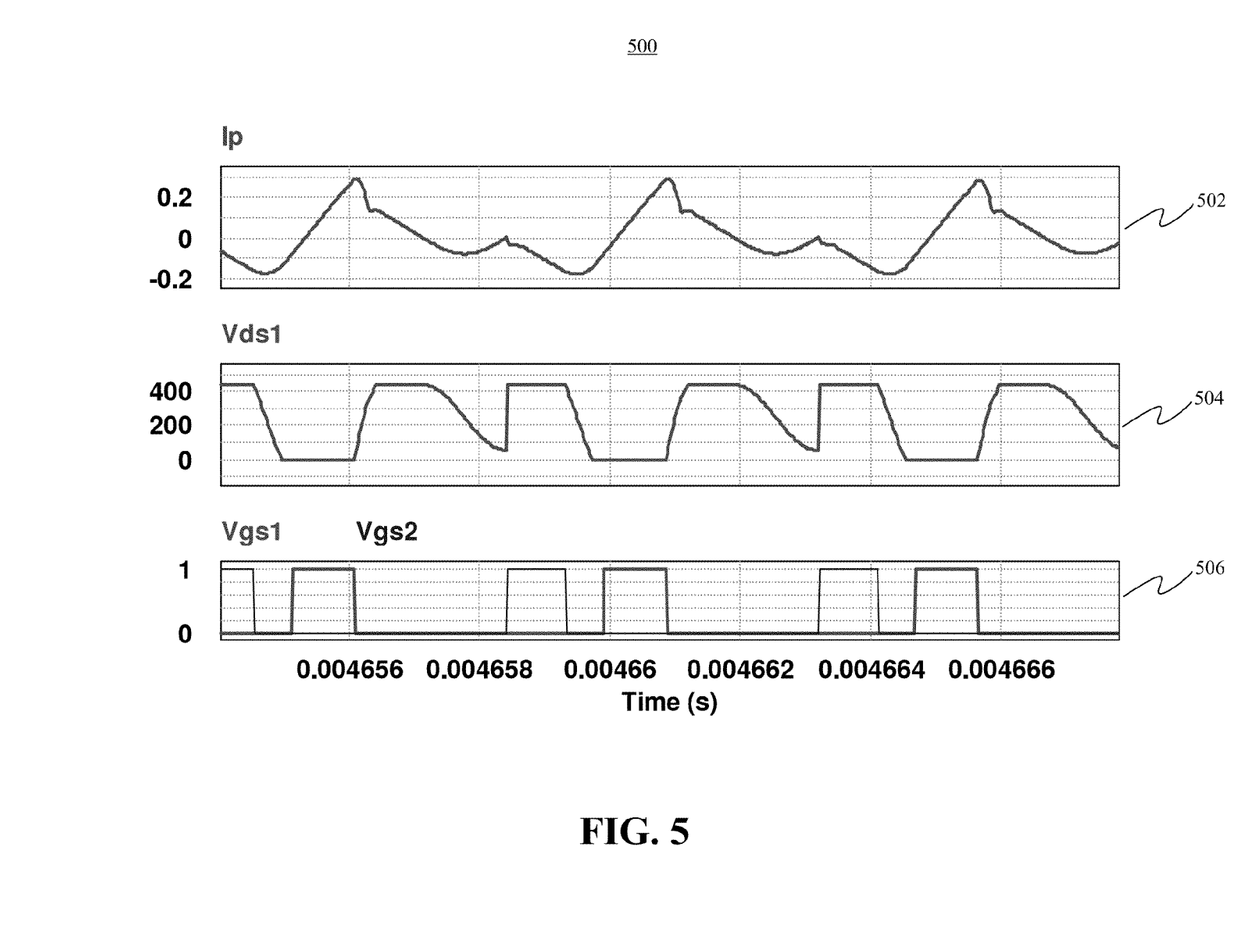
FIG. 5 illustrates a timing diagram of a switching pattern for the PWM mode consistent with one embodiment of the present disclosure.

FIG. 5 illustrates a timing diagram 500 of a switching pattern for the PWM mode to minimize switching losses such that the Q2-Q1 transition always allows Zero Voltage Switching (ZVS) of Q1. Timeline 502 shows the transformer primary side current (Ip). Timeline 504 illustrates the Vds voltage across switch Q1. Timeline 506 illustrates the on off switching of VGS1 and VGS2. The conduction of Q2 builds up current (Ip) in the transformer and the energy stored in the transformer inductance discharges the output capacitance (Coss) of the switch Q1 during the dead time after Q2 is turned off. It can be seen that the drain-to-source voltage of Q1 reaches zero before the gate drive signal Vgs1 is applied, such that Q1 is turned on with zero voltage.

Figure 6:
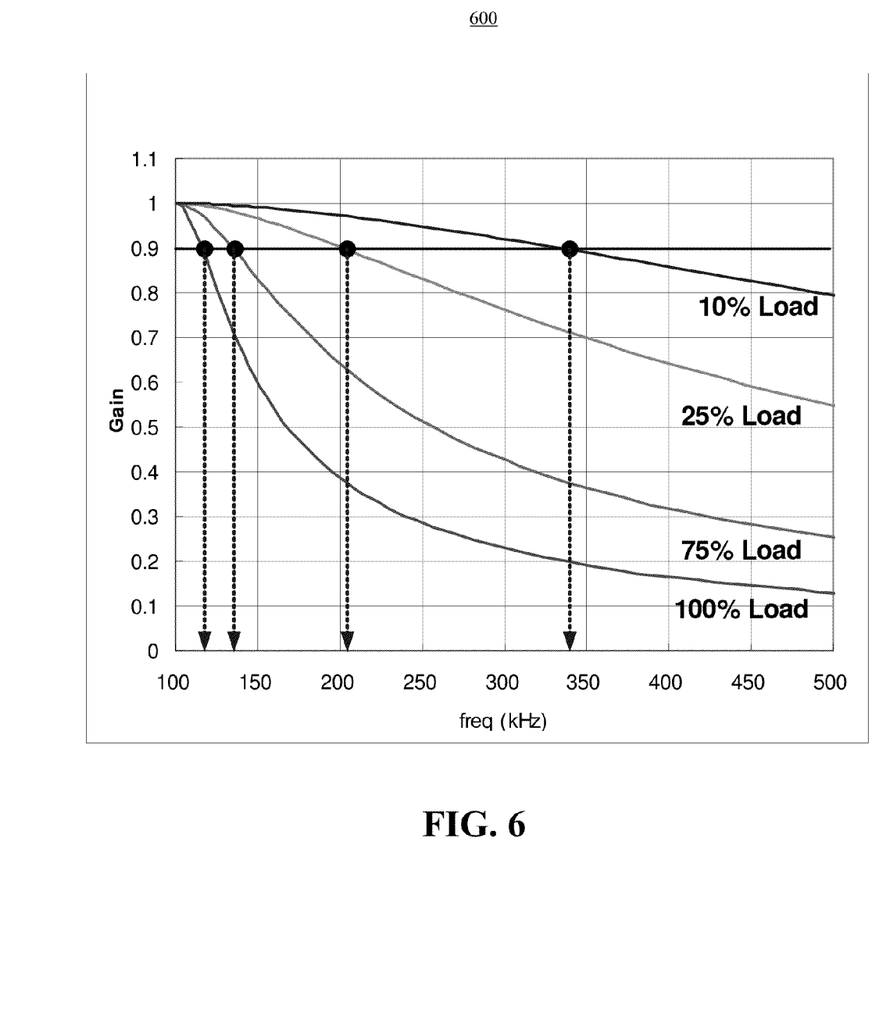
FIG. 6 illustrates various performance parameters associated with a DC to DC series resonant converter system consistent with various embodiments of the present disclosure.

FIG. 6 illustrates various performance parameters 600 associated with a DC to DC series resonant converter system consistent with various embodiments of the present disclosure. The gain of the converter is shown on the vertical axis as a function of switching frequency on the horizontal axis under varying load conditions ranging from 10% to 100%. As can be seen, switching frequency generally needs to be increased as the load is decreased in order to maintain a desired gain, in this case a value of 0.9.

Figure 7:
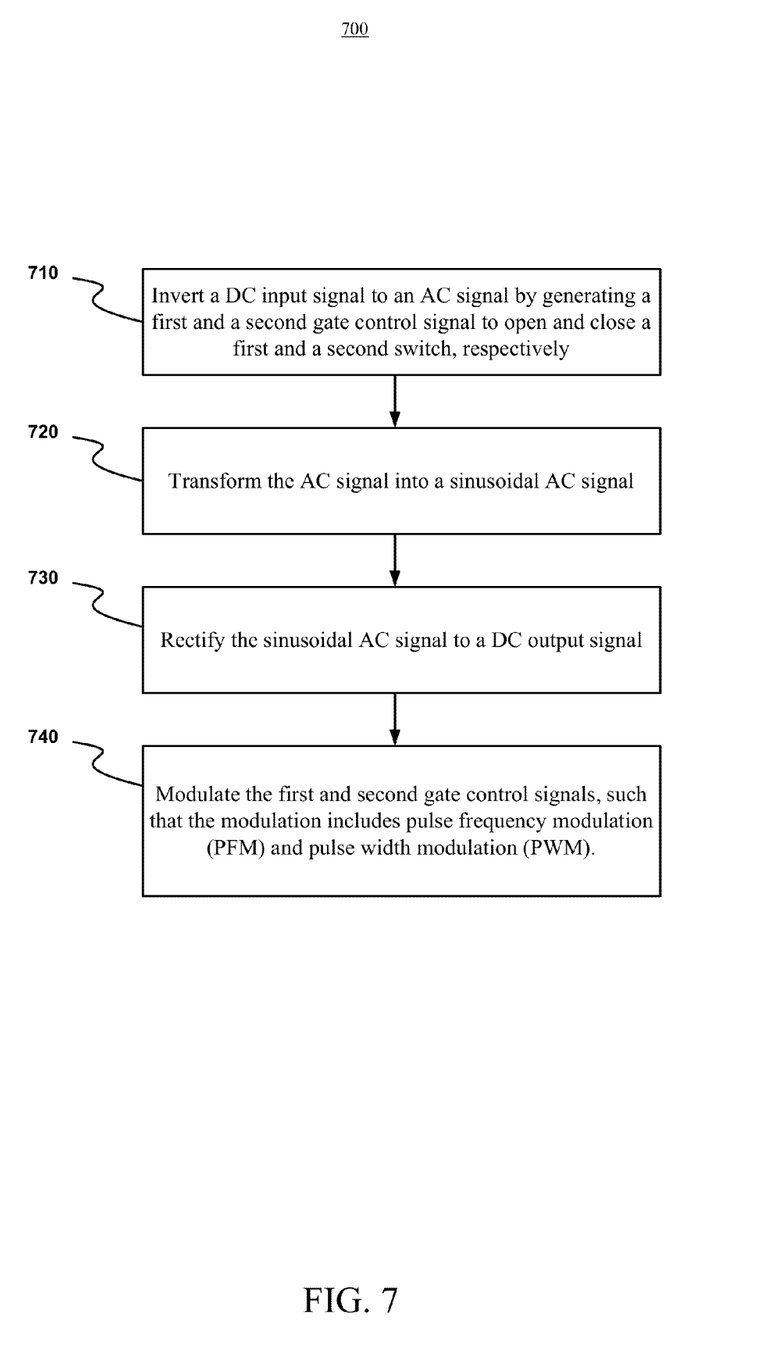
FIG. 7 illustrates a flowchart of operations of an exemplary embodiment consistent with the present disclosure.

FIG. 7 illustrates a flowchart of operations 700 of an exemplary embodiment consistent with the present disclosure. At operation 710, a DC input signal is inverted to an AC signal by generating a first and a second gate control signal to open and close a first and a second switch, respectively. At operation 720, the AC signal is transformed into a sinusoidal AC signal. At operation 730, the sinusoidal AC signal is rectified to a DC output signal. At operation 740, the first and said second gate control signals are modulated. The modulation includes pulse frequency modulation (PFM) and pulse width modulation (PWM).

According to one aspect, the present disclosure features a DC to DC converter system. The DC to DC converter system includes an inverter circuit having a first and a second switch. The inverter circuit is configured to generate a first and a second gate control signal configured to open and close the first and second switch, respectively, and generate an AC signal from a DC input signal. The DC to DC converter system also includes a transformer circuit configured to transform the AC signal into a sinusoidal AC signal. The DC to DC converter system further includes a second stage circuit configured to rectify the sinusoidal AC signal to a DC output signal. The DC to DC converter system further includes a hybrid control circuit configured to modulate the first and second gate control signals, wherein the modulation comprises pulse frequency modulation (PFM) and pulse width modulation (PWM).

According to another aspect, the present disclosure features a method including inverting a DC input signal to an AC signal by generating a first and a second gate control signal to open and close a first and a second switch, respectively. The method also includes transforming the AC signal into a sinusoidal AC signal. The method further includes rectifying the sinusoidal AC signal to a DC output signal. The method further includes modulating the first and said second gate control signals, wherein the modulation comprises pulse frequency modulation (PFM) and pulse width modulation (PWM).

The term "switches" may be embodied as MOSFET switches (e.g. individual NMOS and PMOS elements), BJT switches and/or other switching circuits known in the art. In addition, "circuitry" or "circuit", as used in any embodiment herein, may comprise, for example, singly or in any combination, hardwired circuitry, programmable circuitry, state machine circuitry, and/or circuitry that is included in a larger system, for example, elements that may be included in an integrated circuit.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A DC to DC converter system, comprising:
   inverter circuitry having a first and a second switch, said inverter circuitry further configured to generate a first and a second gate control signal configured to open and close said first and said second switch, respectively, and generate an AC signal from a DC input signal;
   transformer circuitry configured to transform said AC signal into a sinusoidal AC signal;
   second stage circuitry configured to rectify said sinusoidal AC signal to a DC output signal; and
   control circuitry configured to modulate said first and said second gate control signals, wherein said modulation comprises pulse frequency modulation (PFM) and pulse width modulation (PWM), the control circuitry configured to switch between the pulse width modulation (PWM) under first load conditions and the pulse frequency modulation (PFM) under second load conditions, the second load conditions being greater than the first load conditions.

2. The DC to DC converter system of claim 1, wherein said PFM is limited to a preset upper frequency threshold.

3. The DC to DC converter system of claim 2, wherein said PWM modulates said gate control signals when said PFM reaches said preset upper frequency threshold.

4. The DC to DC converter system of claim 1, wherein said PFM is configured to operate at an approximately 50 percent duty cycle comprising a dead time such that said closing of said first and said second switches occur at a substantially zero voltage across each of said switches.

5. The DC to DC converter system of claim 1, wherein said PWM is configured such that said closing of one of said first and said second switches occurs at a substantially zero voltage across said switch.

6. The DC to DC converter system of claim 2, further comprising voltage controlled oscillator circuitry configured to sequentially charge and discharge a pulse frequency modulated capacitor (PFMcap) such that the voltage (VCT) of said PFMcap oscillates between a high voltage threshold (VTH) and a low voltage threshold (VTL) in a triangular waveform.

7. The DC to DC converter system of claim 6, wherein said VCT is compared to a clamp voltage to limit said PFM to said preset upper frequency threshold.

8. The DC to DC converter system of claim 6, further comprising a feedback compensation circuit, wherein said VCT is compared to a comparison voltage (Vcomp) to adjust a duty cycle associated with said PWM, wherein said Vcomp is derived from said feedback compensation circuit to regulate said DC output signal.

9. A method for DC to DC conversion, comprising:
inverting a DC input signal to an AC signal by generating a first and a second gate control signal to open and close a first and a second switch, respectively;
transforming said AC signal into a sinusoidal AC signal;
rectifying said sinusoidal AC signal to a DC output signal; and
modulating said first and said second gate control signals, wherein said modulation comprises pulse frequency modulation (PFM) and pulse width modulation (PWM), said modulation switching between the pulse width modulation (PWM) under first load conditions and the pulse frequency modulation (PFM) under second load conditions, the second load conditions being greater than the first load conditions.

10. The method of claim 9, further comprising limiting said PFM to a preset upper frequency threshold.

11. The method of claim 10, further comprising said PWM modulating said gate control signals when said PFM reaches said preset upper frequency threshold.

12. The method of claim 9, further comprising operating said PFM at an approximately 50 percent duty cycle comprising a dead time such that said closing of said first and said second switches occur at a substantially zero voltage across each of said switches.

13. The method of claim 9, further comprising operating said PWM such that said closing of one of said first and said second switches occurs at a substantially zero voltage across said switch.

14. The method of claim 10, further comprising sequentially charging and discharging a pulse frequency modulated capacitor (PFMcap) such that the voltage (VCT) of said PFMcap oscillates between a high voltage threshold (VTH) and a low voltage threshold (VTL) in a triangular waveform.

15. The method of claim 14, further comprising comparing said VCT to a clamp voltage to limit said PFM to said preset upper frequency threshold.

16. The method of claim 14, further comprising comparing said VCT to a comparison voltage (Vcomp) to adjust a duty cycle associated with said PWM, wherein said Vcomp is derived from feedback of said DC output signal to regulate said DC output signal.

* * * * *